Patented Nov. 6, 1951

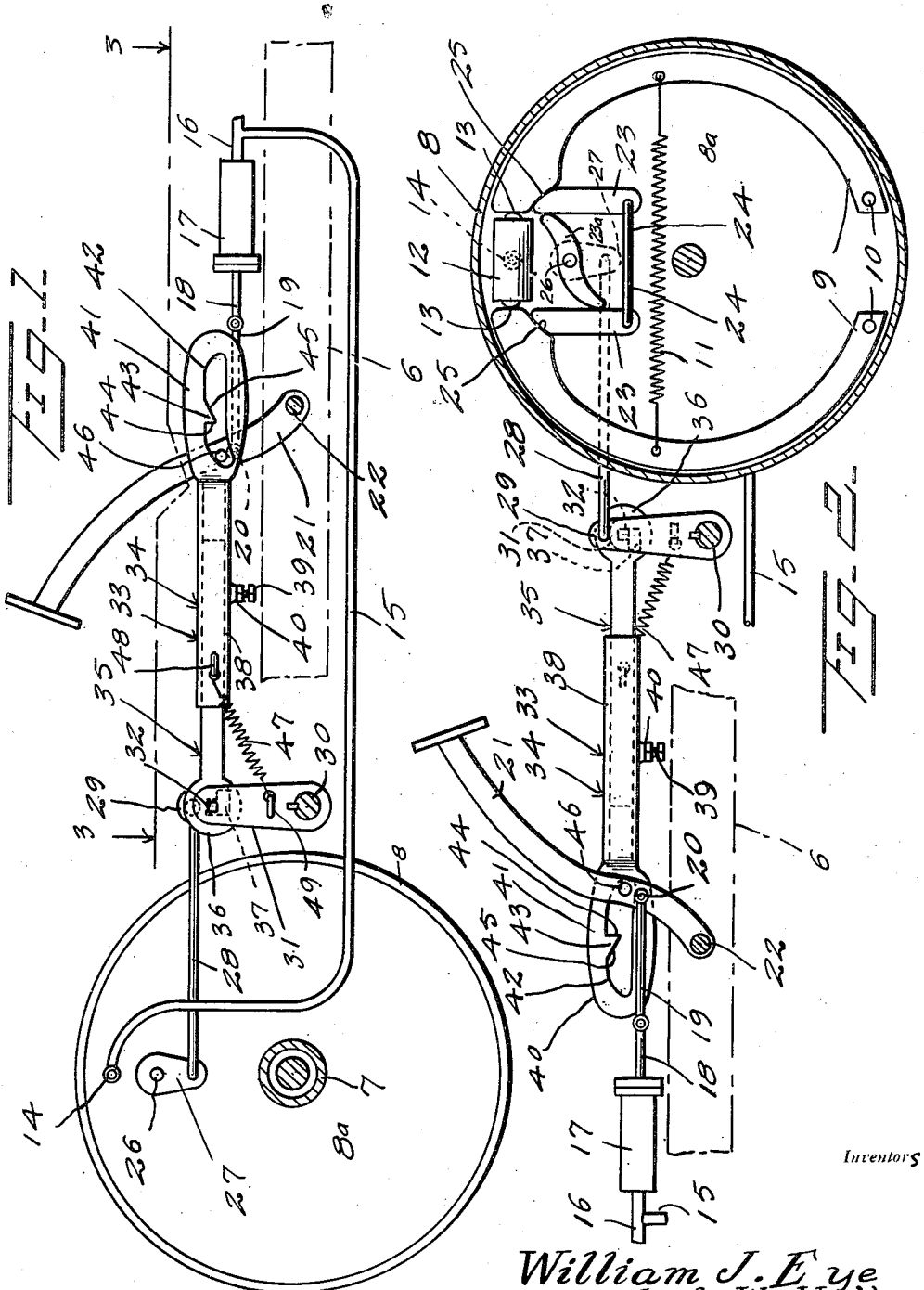

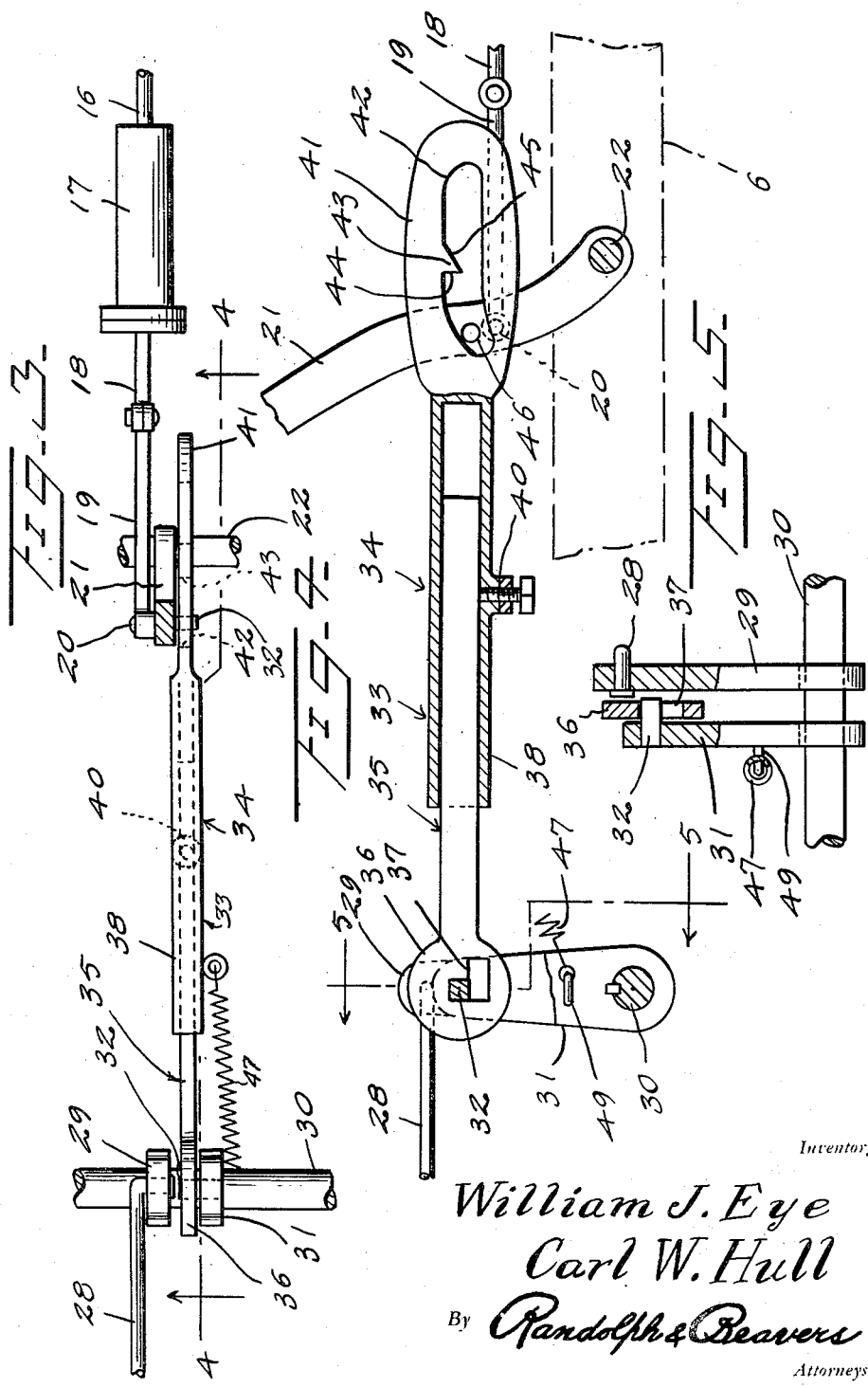

2,574,255

UNITED STATES PATENT OFFICE 2,574,255

SINGLE PEDAL COMBINATION HYDRAULIC
AND MECHANICAL VEHICLE BRAKE

William J. Eye and Carl W. Hull, Bartow, W. Va.;
said Eye assignor to A. Ray Hull, Bartow,
W. Va.

Application November 6, 1946, Serial No. 708,058

3 Claims. (Cl. 188—106)

1

This invention relates to a combination hydraulic and mechanical brake for motor vehicles and more particularly to a hydraulic and a mechanical actuating means between a brake pedal and the brake shoes of a vehicle whereby, in case of failure of the hydraulic brakes for any reason, the mechanical brake actuating means will be subsequently actuated by the brake pedal and during its movement toward a brake applying position, for insuring actuation of the brake shoes for stopping the vehicle.

More particularly, it is a primary object of the present invention to provide a novel mechanical linkage between a foot actuated brake pedal and the brake shoes of a vehicle which is so constructed and arranged that it may readily function in conjunction with a hydraulic brake system to be actuated by the brake pedal only in case of failure of the hydraulic system, which otherwise will remain in an inoperative position but so disposed to be actuated promptly upon failure of the hydraulic brake system and during depression of the foot pedal when the hydraulic brake system first fails to thus insure a brake actuating connection between the brake shoes and brake pedal.

Other objects and advantages of the invention will hereinafter become more fully apparent from the following description of the drawings, illustrating a preferred embodiment thereof, and wherein:

Figure 1 is a side elevational view showing the invention in an applied position;

Figure 2 is a similar view looking in the opposite direction to Figure 1;

Figure 3 is a horizontal sectional view taken substantially along a plane as indicated by the line 3—3 of Figure 1;

Figure 4 is a longitudinal vertical sectional view taken substantially along a plane as indicated by the line 4—4 of Figure 3; and Figure 5 is a cross sectional view taken substantially along a plane as indicated by the line 5—5 of Figure 4.

Referring more specifically to the drawings, for the purpose of illustrating the invention, the numeral 6 designates a side beam or rail of a motor vehicle chassis frame, shown in dotted lines, 7 designates the rear axle housing on which is mounted a brake drum 8 having a backing plate 8a containing a pair of brake shoes 9 which are pivotally mounted at their lower ends 10. The brake shoes 9 are normally urged inwardly on their pivots 10 and away from the cylindrical wall of the brake drum 8 by a contractile coiled

2 spring 11 which is disposed between and connected at its ends to the intermediate portions of the brake shoes 9. A hydraulic brake cylinder 12 is disposed between the free ends of the brake shoes 9 and has piston rods projecting from the ends thereof, as seen at 13 and which are connected to pistons, not shown, actuated by fluid admitted to the intermediate portion of the cylinder 12 for forcing the piston rods 13 outwardly to thereby expand the brake shoes 9 into engagement with the drum 8.

The cylinder 12 is connected, intermediate of its ends, at 14 to a pipe or conduit 15 forming a part of the hydraulic brake system and which is connected at its opposite end by a conduit 16 to one end of the master cylinder 17 of the system. It is to be understood that a similar brake is associated with each of the other wheels of the vehicle and connected by other pipes, corresponding to the pipe 15 and leading from the main conduit 16. The master cylinder 17 contains a piston, not shown, which is reciprocally disposed therein and which has a piston rod 18 projecting from the rear end of said master cylinder and which is pivotally connected to one end of a push rod 19, the opposite end of which is pivotally connected at 20 to a brake pedal 21 which is pivotally mounted at 22 on the beam 6. The lever portion of the brake pedal 21 extends upwardly and rearwardly from its pivoted end 22 or in a direction generally away from the master cylinder 17, as clearly illustrated in Figures 1 and 2.

The structure as previously described constitutes a conventional hydraulic brake system and, accordingly, forms no part of the present invention.

As best illustrated in Figure 2, a pair of mechanical brake dogs 23 are pivotally mounted at their lower ends in the brake drum 8 on a brace 24 which is anchored to the backing plate 8a. The dogs 23 have upper ends which bear against faces 25 formed on adjacent edges of the free ends of the brake shoes 9 and by means of which the brake shoes are expanded into engagement with the drum 8 when the dogs 23 are swung outwardly. A mechanical brake dog cam 23a is keyed intermediate of its ends on a shaft 26 which is journaled in and extends through the backing plate 8a so that when said shaft is revolved in a clockwise direction, as seen in Figure 2, the cam shaped end portions of the dog cam 23a will bear against and spread the brake dogs 23 for mechanically applying the brake shoes 9. As seen in Figure 1, a lever or crank 27 is keyed to the opposite end of the shaft 26 and on the outer side of the brake drum 8 and has its free end pivotally connected to one end of a push rod 28, the opposite end of which is pivotally connected to the free end of a crank 29. The crank 29, at its opposite end, is keyed to a transversely disposed shaft 30 which is journaled at one end in the beam 6 and at its opposite end in a corresponding beam, not shown, disposed at the opposite side and longitudinally of the vehicle.

The assembly and arrangement of the parts 23 to 29, inclusive, constitute a conventional brake applying unit and it will be readily apparent that the brake shoes associated with each wheel of the vehicle may be similarly connected to the shaft 30 so that when said shaft is turned in one direction, clockwise as seen in Figure 1, the brake shoes 9 will be mechanically applied. Accordingly, the mechanical linkage as previously described likewise constitutes no part of the present invention but has merely been illustrated and described to afford a more comprehensive understanding of the invention, now to be described.

The invention includes a crank 31 which is keyed to and projects upwardly from the shaft 30 and which is provided at its upper end with a laterally projecting crank pin 32 of rectangular cross section. A connecting rod, designated generally 33 is formed of telescoping sections, designated generally 34 and 35. The section 35 is in the form of a rod having an enlarged, disk shaped head 36 at its rear end which is provided with an L-shaped opening 37, as best seen in Figure 4, to receive the pin 32 of the crank 31.

The rod shaped forward end of section 35 of the connecting rod 33 telescopes into a rear sleeve portion 38 of the connecting rod section 34 and is adjustably fixed thereto by a set screw 39 which is mounted radially of the sleeve portion 38 in an internally threaded boss 40 thereof. The opposite, forward end of the connecting rod section 34 is in the form of an elongated substantially flat plate 41 which is disposed in substantially a vertical plane and which is provided with a longitudinally disposed slot 42 into which projects a lug or shoulder 43, forming an integral part of the plate 41 and which extends into the upper part of the slot 42, intermediate of the ends thereof. The lug or projection 43 is provided with a rearwardly facing shoulder 44 which is disposed substantially at a right angle to the longitudinal axis of the slot 42 and an opposite, inclined forward edge 45. The plate 41 is disposed on one side of and adjacent to an intermediate portion of the lever 21 and a pin 46 projects from said side of the foot pedal lever 21 and is loosely disposed in the slot 42 and normally adjacent the rear end thereof. A contractile coiled spring 47 is anchored at one end to an eye fastening 48 which projects from a side of the sleeve member 38 and is anchored at its opposite end to a similar fastening 49 which projects from the corresponding side of the crank 31. The spring 47 tends to urge the connecting rod 33 downwardly for retaining the squared pin 32 in engagement with the upper end of the L-shaped slot 37, in which it is closely received, and by means of which the connecting rod 33 is keyed to the crank 31 and normally supported in the position as illustrated in Figures 1 and 2.

From the foregoing it will be readily apparent that the foot pedal 21 may be depressed for actuating the piston of the master cylinder 17 through the piston rod 18 and push rod 19 for applying hydraulic pressure to each of the cylinders 12 to apply the brake shoes 9, as previously described. In this movement of the brake pedal 21 in the application of the brake shoes 9 by the hydraulic system, the pin 46 of the brake pedal 21 moves in the slot 42, between the rear end thereof and the rearwardly facing shoulder 44 of the lug 43 so that the connecting rod 33 is not actuated by the normal operation of the hydraulic brake system. To insure that the mechanical brake actuating means, previously described, will not be normally actuated, the connecting rod section 34 can be adjusted relatively to the section 35 by loosening the set screw 39 so that the brake pedal 21 in its normal movement, will not move a sufficient distance to bring the pin 46 into engagement with the lug 43. In case of failure of the hydraulic brake system, as for example should a leak occur in the fluid line thereof, the master cylinder 17 will not resist the movement of the brake pedal 21 toward a depressed, applied position, and accordingly the pedal will continue to move until the pin 46 strikes the shoulder 44 of the lug 33 so that continued movement of the brake pedal will cause the connecting rod 33 to move forwardly therewith as the pin 46 slidably engages the shoulder 44 for rocking the crank 31, shaft 30 and crank 29 in a clockwise direction, as seen in Figure 1 to move the connecting rod 28 from left to right of Figure 1 thus rocking the crank 27 in a counterclockwise direction of Figure 1 or clockwise as seen in Figure 2, for rotating the dog actuator cam 25 in a clockwise direction (Figure 2) to thereby mechanically apply the brake shoes 9. It will be readily apparent that the brake shoes of each of the brake drums will be applied in a similar manner through rotation of the shaft 30, to which each of the brake shoes are connected in the same manner as illustrated in Figure 2. When the pressure is released on the foot pedal 21 the springs 11 return the brake shoes 9 to their normal, retracted positions to thus return the cranks 31 and 29 to their positions of Figures 1 and 2 so that all of the parts of the mechanical brake actuator will return to their positions as shown in these views.

It will be readily apparent that the connecting rod 33 may be displaced upwardly and rearwardly for positioning the pin 32 in the forward end of the lower portion of the L-shaped slot 37 and that the spring 47 will then function to retain the rod 33 thus disposed and in which position it will be upwardly offset with respect to its position of Figure 4, so that when the foot pedal lever 21 is swung forwardly the pin 46 thereof may pass under the projection 43, so that the mechanical brake actuating means may thereby be rendered inoperative if desired.

Various modifications and changes are contemplated and may obviously be resorted to, without departing from the spirit and scope of the invention as hereinafter defined by the appended claims.

We claim:

1. In combination with a hydraulic brake system of a motor vehicle, a conventional mechanical brake shoe actuating linkage for each of the pairs of brake drums and including a shaft journaled in the vehicle and to which each of said mechanical actuating linkages is connected, a crank keyed to said shaft, a connecting rod connected to the free end of said crank and projecting therefrom substantially at a right angle thereto, said connecting rod having an elongated free end provided with a longitudinally disposed slot, a pin fixed to and projecting laterally from a brake actuating lever, connected to the hydraulic brake system, said pin being normally disposed for unobstructed movement in said slot when the hydraulic brake system is applied by the movement of said lever, and a shoulder extending into said slot and in the path of movement of said pin and disposed to be engaged thereby when the hydraulic brake actuating system fails and the brake applying lever moves to a point beyond its normal travel for applying the brakes through the mechanical brake actuating linkage, said crank having a squared pin projecting from its free end, said connecting rod having an L-shaped slot in one end thereof for receiving said squared pin, and said squared pin being normally disposed in the upper end of the L-shaped slot and being closely engaged thereby for keying the connecting rod to the crank.

2. In combination with a hydraulic brake system of a motor vehicle, a conventional mechanical brake shoe actuating linkage for each of the pairs of brake drums and including a shaft journaled in the vehicle and to which each of said mechanical actuating linkages is connected, a crank keyed to said shaft, a connecting rod connected to the free end of said crank and projecting therefrom substantially at a right angle thereto, said connecting rod having an elongated free end provided with a longitudinally disposed slot, a pin fixed to and projecting laterally from a brake actuating lever, connected to the hydraulic brake system, said pin being normally disposed for unobstructed movement in said slot when the hydraulic brake system is applied by the movement of said lever, and a shoulder extending into said slot and in the path of movement of said pin and disposed to be engaged thereby when the hydraulic brake actuating system fails and the brake applying lever moves to a point beyond its normal travel for applying the brakes through the mechanical brake actuating linkage, said crank having a squared pin projecting from its free end, said connecting rod having an L-shaped slot in one end thereof for receiving said squared pin, and said squared pin being normally disposed in the upper end of the L-shaped slot and being closely engaged thereby for keying the connecting rod to the crank, and contractile spring means for urging said last mentioned end of the connecting rod downwardly and toward the crank for holding the squared pin releaseably in engagement with the upper end of the L-shaped slot or with the forward end of the lower portion of the slot to retain the connecting rod in an operative or inoperative position, respectively.

3. In combination with a hydraulic brake system of a motor vehicle, a conventional mechanical brake shoe actuating linkage for each of the pairs of brake drums and including a shaft journaled in the vehicle and to which each of said mechanical actuating linkages is connected, a crank keyed to said shaft, a connecting rod connected to the free end of said crank and projecting therefrom substantially at a right angle thereto, said connecting rod having an elongated free end provided with a longitudinally disposed slot, a pin fixed to and projecting laterally from a brake actuating lever, connected to the hydraulic brake system, said pin being normally disposed for unobstructed movement in said slot when the hydraulic brake system is applied by the movement of said lever, and a shoulder extending into said slot and in the path of movement of said pin and disposed to be engaged thereby when the hydraulic brake actuating system fails and the brake applying lever moves to a point beyond its normal travel for applying the brakes through the mechanical brake actuating linkage, said connecting rod including a portion provided with a slot having end portions disposed at an angle to one another, a pin of non-circular cross section projecting transversely from the crank and slidably and non-rotatably engaging the slot, and spring means secured to the connecting rod and crank for yieldably retaining the connecting rod with either end portion of its slot in engagement with the pin whereby said connecting rod portion will be supported by the pin in different positions relatively to the free end of the crank.

WILLIAM J. EYE.
CARL W. HULL.

REFERENCES CITED

The following references are of record in the file of this patent:

UNITED STATES PATENTS

| Number | Name | Date |
|---|---|---|
| 1,291,470 | Frazier | Jan. 14, 1919 |
| 1,947,904 | Evans et al. | Feb. 20, 1934 |
| 1,971,366 | Bischof | Aug. 28, 1934 |
| 2,076,047 | Scott | Apr. 6, 1937 |
| 2,147,955 | Baits | Feb. 21, 1939 |
| 2,212,523 | Hawley | Aug. 27, 1940 |

FOREIGN PATENTS

| Number | Country | Date |
|---|---|---|
| 556,970 | France | Oct. 3, 1922 |